US009141866B2

(12) United States Patent
Fan et al.

(10) Patent No.: US 9,141,866 B2
(45) Date of Patent: *Sep. 22, 2015

(54) SUMMARIZING SALIENT EVENTS IN UNMANNED AERIAL VIDEOS

(71) Applicant: International Business Machines Corporation, Armonk, NY (US)

(72) Inventors: Quanfu Fan, Somerville, MA (US); Sachiko Miyazawa, White Plains, NY (US); Sharathchandra Pankanti, Darien, CT (US); Hoang Trinh, Pelham, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 143 days.

This patent is subject to a terminal disclaimer.

(21) Appl. No.: 13/753,713

(22) Filed: Jan. 30, 2013

(65) Prior Publication Data
US 2014/0211987 A1  Jul. 31, 2014

(51) Int. Cl.
*G06K 9/00* (2006.01)
*G06K 9/32* (2006.01)

(52) U.S. Cl.
CPC ............ *G06K 9/3241* (2013.01); *G06K 9/0063* (2013.01); *G06K 9/00771* (2013.01)

(58) Field of Classification Search
CPC .......................... G06K 9/3241; G06K 9/0063
USPC .................. 382/103, 173, 224, 305; 348/169
See application file for complete search history.

(56) References Cited

U.S. PATENT DOCUMENTS

| 5,101,364 | A | 3/1992 | Davenport et al. |
| 7,203,620 | B2 | 4/2007 | Li |
| 8,401,232 | B2 * | 3/2013 | Fan et al. ............ 382/103 |
| 2005/0249412 | A1 | 11/2005 | Radhakrishnan et al. |
| 2009/0080853 | A1 | 3/2009 | Chen et al. |
| 2010/0097471 | A1 | 4/2010 | Drive et al. |
| 2012/0027371 | A1 | 2/2012 | Hackett et al. |

OTHER PUBLICATIONS

Cooharojananone, N. et al. "Real time trajectory search in video summarization using direct distance transform"; 2010 10th Intern'l Conference on Signal Processing Proceedings (ICSP 2010); pp. 932-935; IEEE 2010.
Anonymous, "A Multimedia-Based Document Summarization Method and System", http://priorartdatabase.com/IPCOM/000198965; Aug. 19, 2010.
Gevrekci, LM.-et al.; "Robust Angle of View Estimation for Cameras"; http://www.ip.com/pubview/IPCOM000169505D; Apr. 18, 2008.

* cited by examiner

*Primary Examiner* — Brian Le
(74) *Attorney, Agent, or Firm* — F. Chau & Associates, LLC

(57) ABSTRACT

A method for summarizing image content from video images received from a moving camera includes detecting foreground objects in the images, determining moving objects of interest from the foreground objects, tracking the moving objects, rating movements of the tracked objects, and generating a list of highly rated segments within the video images based on the ratings.

16 Claims, 9 Drawing Sheets

SUMMARIZING SALIENT EVENTS IN UNMANNED AERIAL VIDEOS

BACKGROUND

1. Technical Field

The present disclosure relates to the field of unmanned aerial vehicles, and more particularly to presentation of events or objects captured by the vehicles.

2. Discussion of Related Art

An unmanned aerial vehicle (UAV), commonly known as a drone is an aircraft without a human pilot on board. Its flight is either controlled autonomously by computers in the vehicles, or under the remote control of a pilot on the ground or in another vehicle. UAVs are predominantly deployed for military applications, but are also used in a small but growing number of civil applications, such surveillance of pipelines, natural resource exploration, livestock monitoring, wildfire mapping, transport of medical supplies, etc.

A UAV may be fitted with one or more high definition cameras that can send streaming video to a remote computer for storage thereon. An operator of the remote computer can then review the stored video to determine whether any events of interest have occurred. For example, if the UAV is being used by police to investigate a drug smuggling operation, an event of interest might include images of armed people moving containers into a suspected drug storage facility. While the entire video captured by the UAV may include several hours or days worth of footage, the event of interest may only comprise a few minutes. Thus, it could take an operator manually reviewing the video several hours to determine whether the event of interest has occurred. Further, since the event of interest may occur in a short period of time, the operator can easily miss the event.

Accordingly, there is a need for methods and systems that can automatically summarize the events of interest.

BRIEF SUMMARY

According to an exemplary embodiment of the invention, a method for summarizing image content from video images received from a moving camera includes: detecting foreground objects in the images, determining moving objects of interest from the foreground objects, tracking the moving objects, rating movements of the tracked objects, and generating a list of highly rated segments within the video images based on the ratings.

According to an exemplary embodiment of the invention, a method of presenting a summary of a video includes: tracking moving objects within the video, determining a smoothness value of a trajectory of each tracked object, discarding the tracked objects having smoothness values below a minimum threshold smoothness level, selecting a period of time within the video that includes at least one of the remaining tracked objects, and presenting a frame of the video overlaid with all of the remaining tracked objects that are present during the selected period of time.

BRIEF DESCRIPTION OF THE SEVERAL VIEWS OF THE DRAWINGS

Exemplary embodiments of the invention can be understood in more detail from the following descriptions taken in conjunction with the accompanying drawings in which.

DETAILED DESCRIPTION

Embodiments of the present invention relates to methods and/or systems that may be used to provide a summary of events in unmanned aerial videos.

Figure 1:
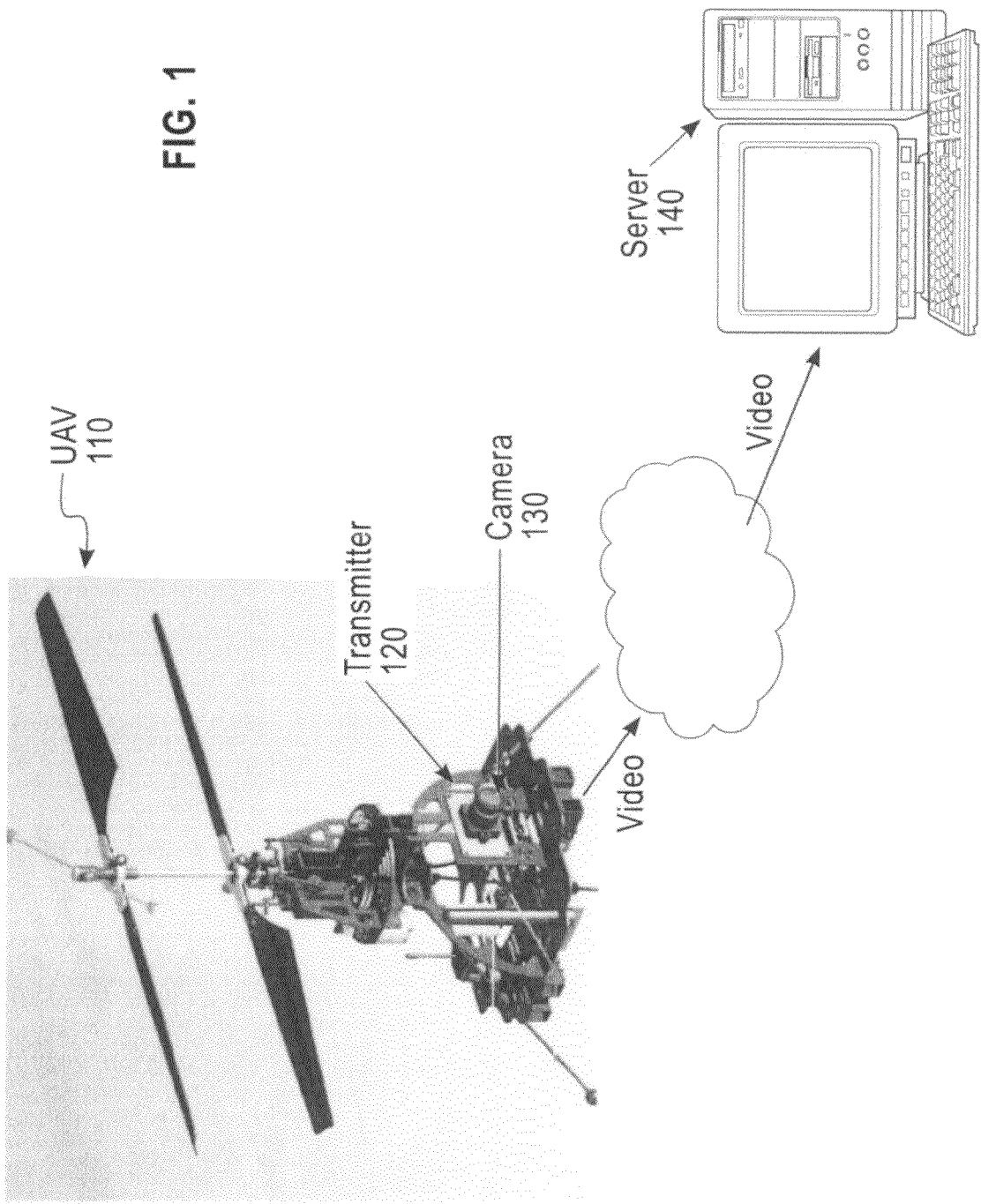
FIG. 1 illustrates a system that operates in accordance with an exemplary embodiment of the present invention.

Referring to FIG. 1, there is illustrated a system that operates in accordance with an embodiment of the present invention. The system includes at least one unmanned aerial vehicle (UAV) 110 and a server 140. The UAV 110 includes a processor (not shown), one or more camera(s) 130 for capturing video images, and a transmitter 120 for transmitting the captured video to server 140.

In an exemplary embodiment, the UAV 110 communicates the captured video to a satellite link and the satellite link provides the video to the server 140, which may be ground based as an example.

The server 140 or another computer may transmit commands to the UAV 110 for operating the UAV 110. The UAV may include a receiver (not shown) for receiving the commands. The server 140 or the other computer may transmit commands to the UAV 110 that adjust its altitude, speed, heading, and its camera 130. The processor of the UAV 110 may execute the received commands.

In the course of its travels, the UAV 110 can be used to accumulate and transmit vast amounts of UAV videos. However, it is difficult for a human operator to effectively scan through the overwhelming amount of UAV videos to identify specific events of interest. Thus, according to at least one embodiment of the present invention, the server 140 is configured to automatically analyze the video content and selectively create a concise summary and visualization that captures the most interesting events in the video.

In at least one exemplary embodiment of the invention, the events of interest consist of moving objects on the ground, along with their trajectories (e.g., a path that a moving object follows through space as a function of time). Examples of the object include people, vehicles (e.g., tanks, cars, trucks, etc.), animals, or complex objects such as a person with a weapon, a person with a container, etc.

In at least one exemplary embodiment of the invention, the server 140 executes a process that ranks event clips according to a specific saliency metric, and provides a user-friendly visualization of a summary of the key frames and video clips.

Figure 2:
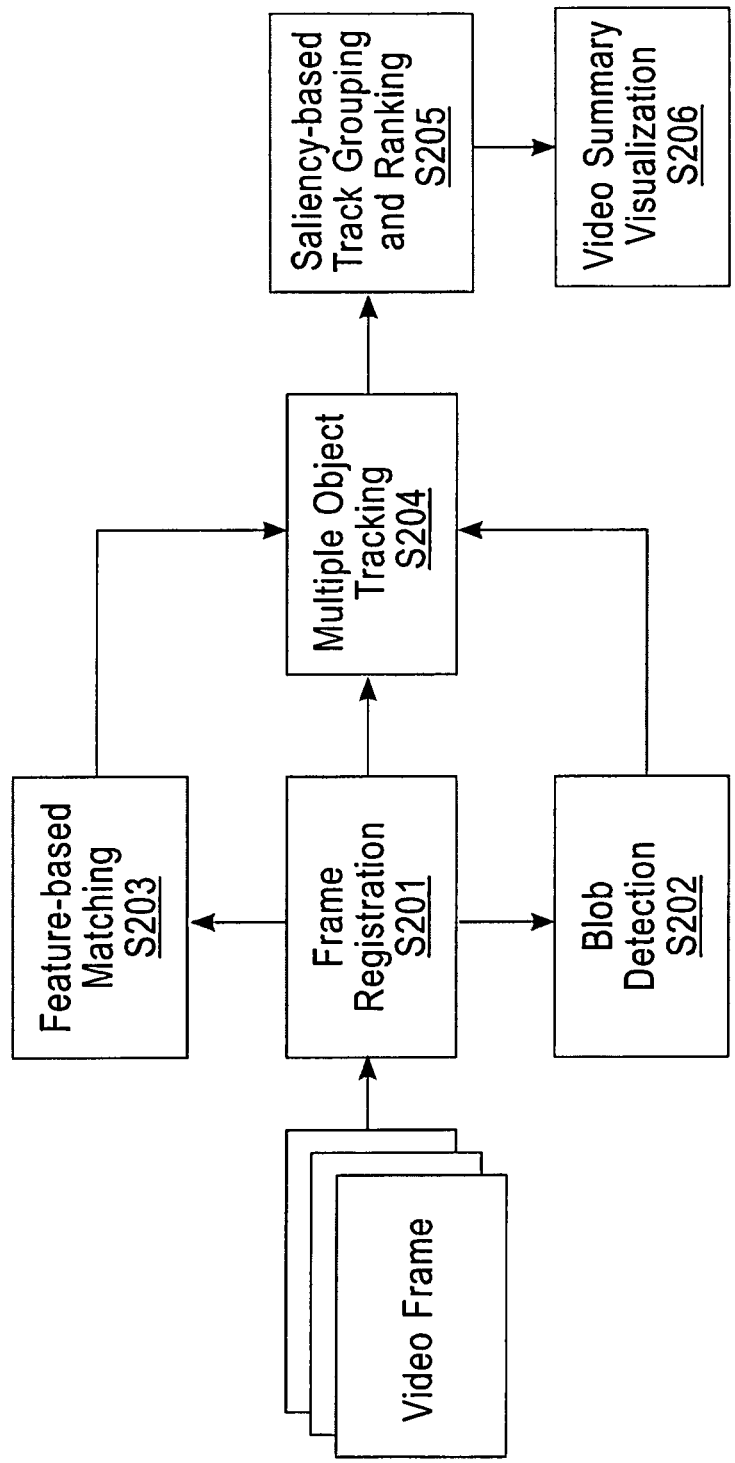
FIG. 2 illustrates a method of generating a summary visualization according to an exemplary embodiment of the invention.

FIG. 2 illustrates a high-level block diagram of the process according to an exemplary embodiment of the invention.

The process performs a frame registration on several input video frames (S201). The frame registration may be performed by applying a forward/backward frame differencing step on the input video frames.

Based on the frame registration, the process performs feature-based matching (S202) and blob detection (S203). The feature-based matching is used to identify objects. The blob detection is used to prevent artifacts in the videos that are not actual objects from being subsequently tracked. Morphological operations may be applied to the registered frames for detecting potential blobs (i.e., the artifacts) and blob verification may be performed using an optical flow method.

The process then tracks multiple objects based on the identified objects and the identified blobs (S204). For example, the identified objects that correspond to the identified blocks can be excluded from tracking.

After the moving objects have been detected and tracked, a saliency score is computed for each tracked object (hereinafter referred to as a track), and the tracks are grouped into video segments and ranked (S205).

Then the process generates a summary video visualization based on the rankings (S206). For example, the process may generate a single-image representation for each selected video segment in the form of a keyframe.

Figure 3:
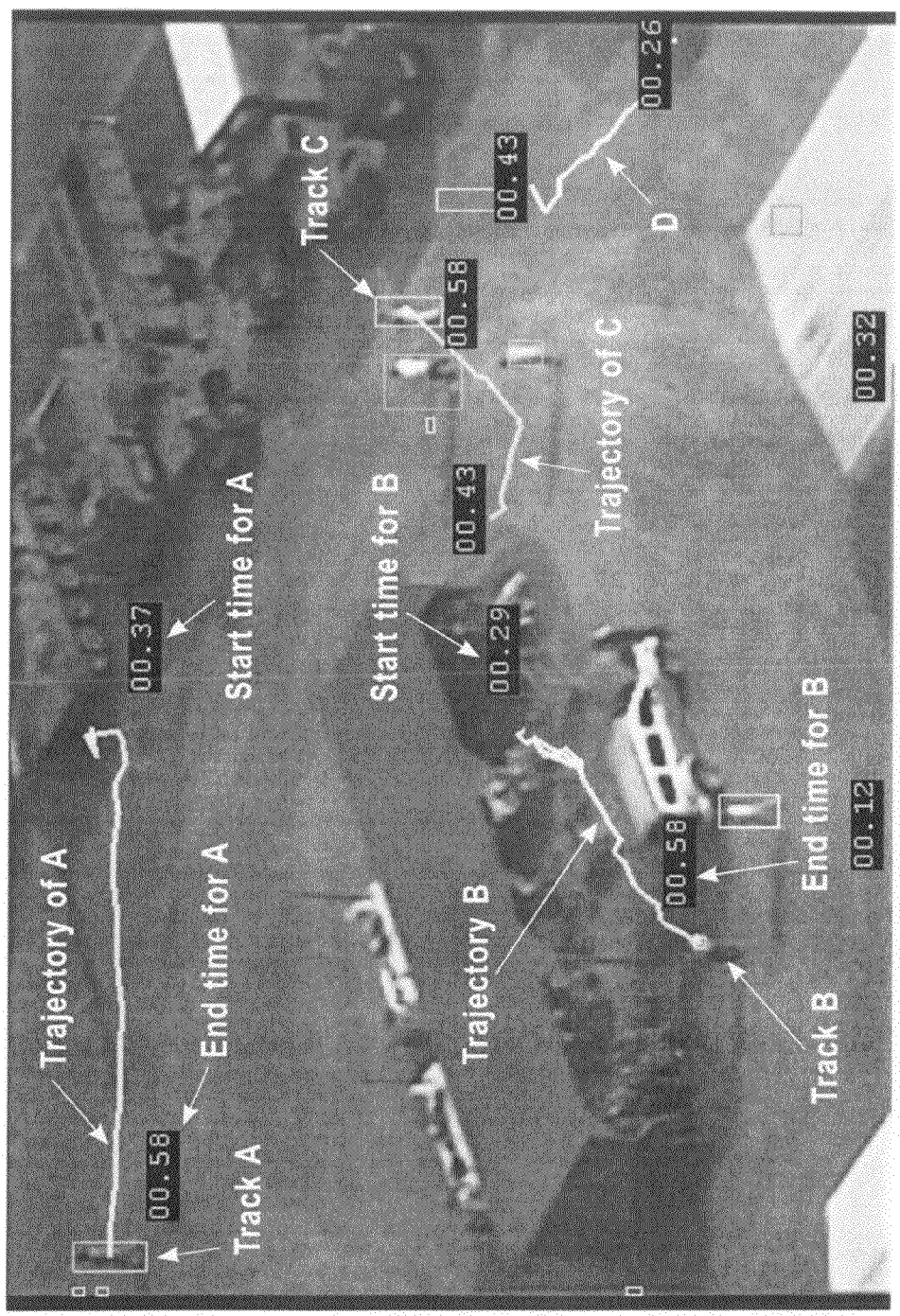
FIG. 3 illustrates an example of the summary visualization.

FIG. 3 illustrates an example of the single-image representation, which includes tracks A, B, C, D (e.g., moving people) and their respective trajectories. For example, as shown in FIG. 3, track A begins at the start point of its associated trajectory curve at time 00.37 and reaches the end point at time 00.58, track B begins at the start point of its associated trajectory curve at time 00.29 and reaches the end point at time 00.58, track C begins at the start point of its associated trajectory curve at 00.43 and reaches the end point at time 00.58, and track D begins at the start point of its associated trajectory curve at 00.26 and reaches the end point at time 00.43. Thus, a single image can be used to efficiently visualize movement of several tracks of interest with respect to a particular background.

Figure 4:
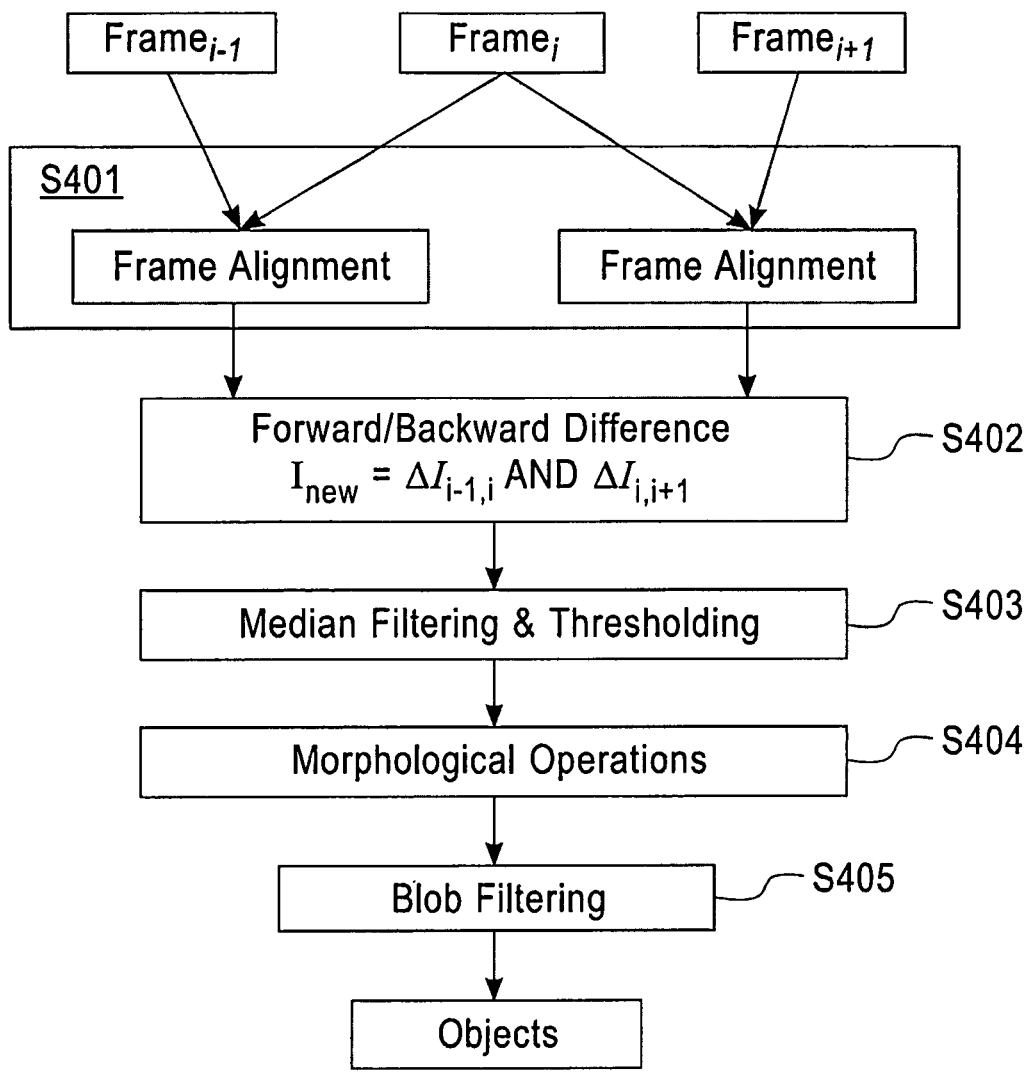
FIG. 4 illustrates a method of detecting objects according to an exemplary embodiment of the invention that may be used in generating the summary visualization.

FIG. 4 illustrates a high-level flow chart for a method of detecting objects to be tracked according to an exemplary embodiment of the invention.

The method includes generating a series of frame alignments (S401). In an exemplary embodiment, the generation of the frame alignments comprises computing the affine homography between two consecutive frames. The affine homography may be computed by extracting Harris corner points from both frames and then doing feature point matching using normalized cross correlation, which may be combined with a Random Sample Consensus (RANSAC) method for outlier removal. Affine transformation parameters can be computed from as few as four feature points. The Affine transformation parameters can be determined using a least squares technique, as an example. Once the affine homography is computed, it can be used to warp and align the frames so that temporal frame differencing can be performed.

However, instead of using simple subtraction from frame differencing, an exemplary embodiment of the invention uses a forward/backward frame differencing method (S402). For example, a forward difference can be calculated from subtracting a frame of time t from a frame of time t+1 and a backward difference can be calculated from subtracting a frame of time t from the frame of time t−1, and then the resulting forward and backward differences can be combined using the AND operator to generate a more selective difference image, from which objects can be detected. Use of the forward/backward differencing method may reduce motion noise and compensate for illumination variation. Media filtering and thresholding can be performed on the calculated image (S403). Morphological operations can be performed on the result of the filtering and thresholding (S404). Blob filtering can then be performed on a result of the operations to filter out false blobs (S405) to result in one or more objects of interest.

In an exemplary embodiment, to filter out the false blobs, an optical flow based on sparse Kanade-Lucas-Tomasi (KLT) features is used to estimate the motion of each blob, and those blobs with no motion or a motion below a certain threshold can be discarded.

Once the objects have been detected, they need to be tracked over time. However, due to challenges in UAV video data, traditional intensity-based target representation is no longer suitable due to large scale variation and perspective geometric distortion. Accordingly, a MeanShift tracking approach could be used as the main tracker. To efficiently characterize the object, a histogram-based feature space may be chosen. In an exemplary embodiment of the invention, metrics based on a Bhattacharyya coefficient may be used to define a similarity metric for object tracking.

In an exemplary embodiment of the invention, to make tracking more robust, a KLT based tracking approach is combined with the MeanShift tracking approach. A KLT based tracking approach is based on finding an affine transform between objects from consecutive frames using the robust KLT feature matching, which is a similar technique to the frame alignment step, but only applied to objects. The results from MeanShift, KLT and motion detection (e.g., results from forward/backward frame alignment) can then be combined to better track the objects.

In an exemplary of the invention, a more precise tracking result is obtained by dynamically updating the target model for a tracked object. Both recent tracking results and previous target models may be used to update the current model, as formulated in the following equation 1:

$$q_i^t = (1-\alpha)q_i^{t-1} + \alpha p_i^t \tag{1}$$

where $q_i$ is the target model for object i, $p_i^t$ is the model of object i as detected at time t, and $\alpha$ is the learning rate (e.g., 0.1, 0.2, etc.)

Figure 5:
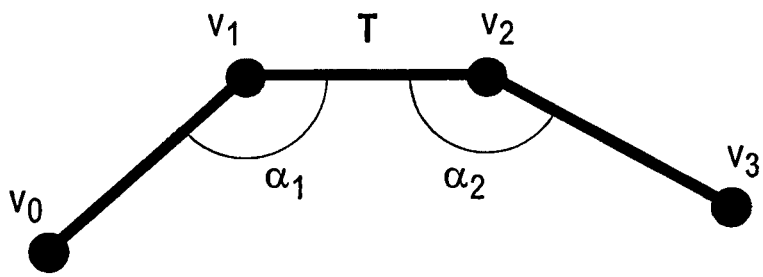
FIG. 5 illustrates an exemplary trajectory of one of the detected objects.

After the moving objects have been detected and tracked, a method according to an exemplary embodiment of the invention is used to compute a saliency score of each track. An object track T may be defined by a sequence of 2D points in an image coordinate system $[v_0, v_1, \ldots, v_N]$. The saliency score of object track T may be computed according to the following equation 2:

$$\text{Score}(T) = \frac{1}{N-1} \sum_{N-1}^{i=1} \frac{1 - \cos\alpha_i}{2} \tag{2}$$

where $\alpha_i$ is formed by each triple of points as shown in FIG. 5, and N is the track length. According to equation 2, the score Score(T) is greater or equal to 0 and less than or equal to 1. The higher the saliency score, the smoother trajectory path of the tracked object. In at least one embodiment of the invention, a higher saliency score is preferred over a lower saliency score. For example, a track that follows a smooth trajectory path as compared to a jerky path is believed to more likely correspond to an event of interest.

Figure 6:
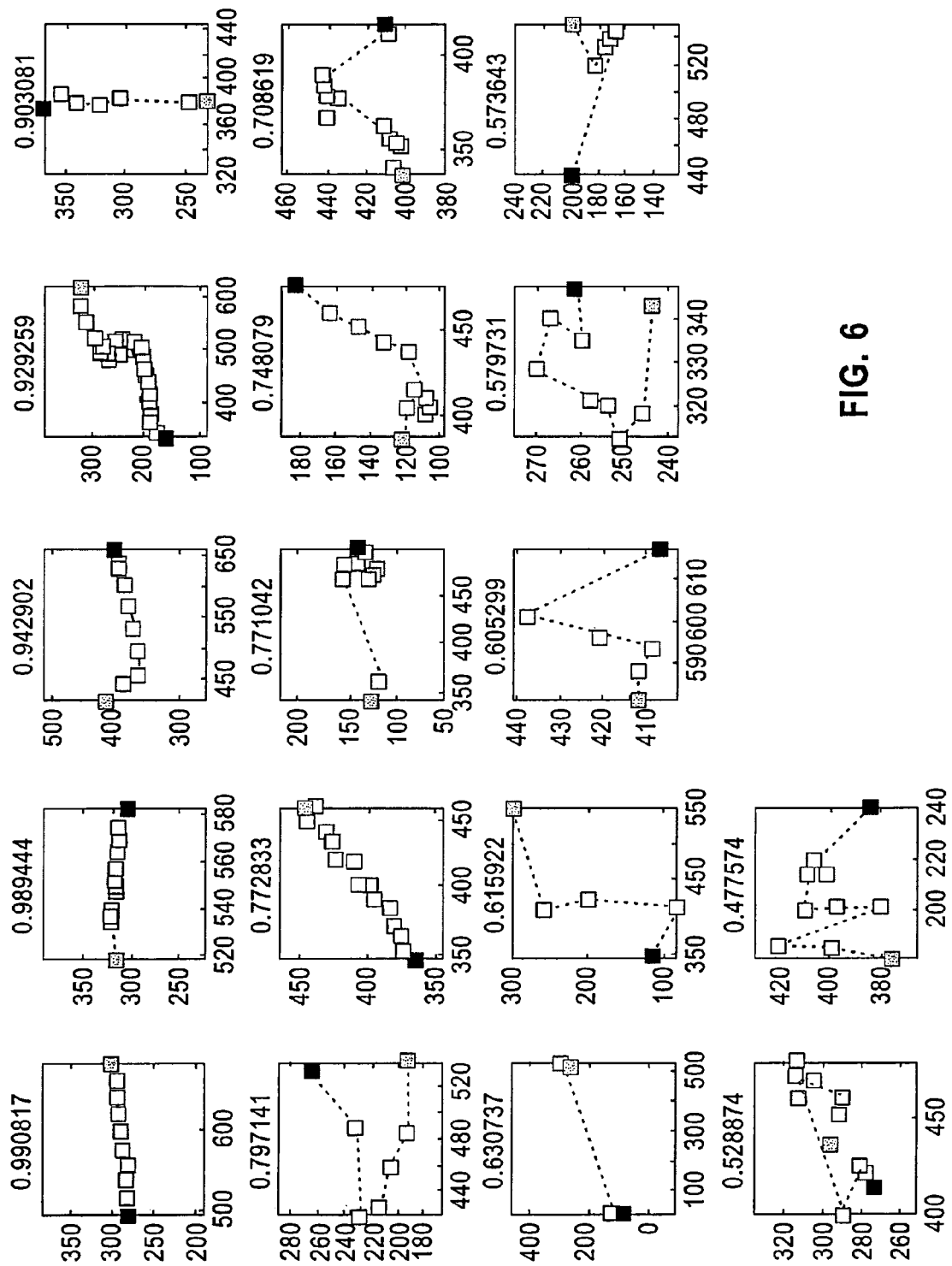
FIG. 6 illustrates further exemplary trajectories of the detected objects along with a saliency metric.

FIG. 6 shows a list of tracked objects sorted according to their respective scores. As shown in FIG. 6, the tracks that follow the smoothest paths have the highest scores. For example, the first track with a score of 0.990817 follows the smoothest path while the last track with a score of 0.477574 is considered to follow the least smooth path. For example, the gait or pattern of movement of a person could correspond to the path followed by the first track, whereas the path followed by the last track may be too erratic to correspond to a person. Thus, a score threshold τ can be set, and then only the tracks with a score above the score threshold τ can be selected (i.e., the most salient tracks), and the rest can be ignored.

Next, of the remaining tracks, groups are formed by those that can be contained by one single video segment. For example, FIG. 3 is an example of a group of 4 tracks (A-D) that can be contained by a common background image over the course of a period of time from time 00.26 to 00.58 (e.g., a video segment). For example, all four tracks are present within the bounds of the background image for the entire period between time 00.26 to time 00.58. Further, it is assumed that all four track had saliency scores that exceeded the predefined score threshold τ. If the saliency score of track A, for example, happened to be lower than the score threshold τ, FIG. 3 would look similar, but would fail to include Track A and its corresponding Trajectory.

Each video segment having at least one salient track may be assigned its own score based on the scores of the tracks it contains. For example, the video segment score for segment 00.26-00.58 could be determining by summing the four saliency scores of tracks A-D. For example, if the tracks have respective scores such as the first four tracks in FIG. 6, the overall score for the video segment could be 3.852422.

Figure 7:
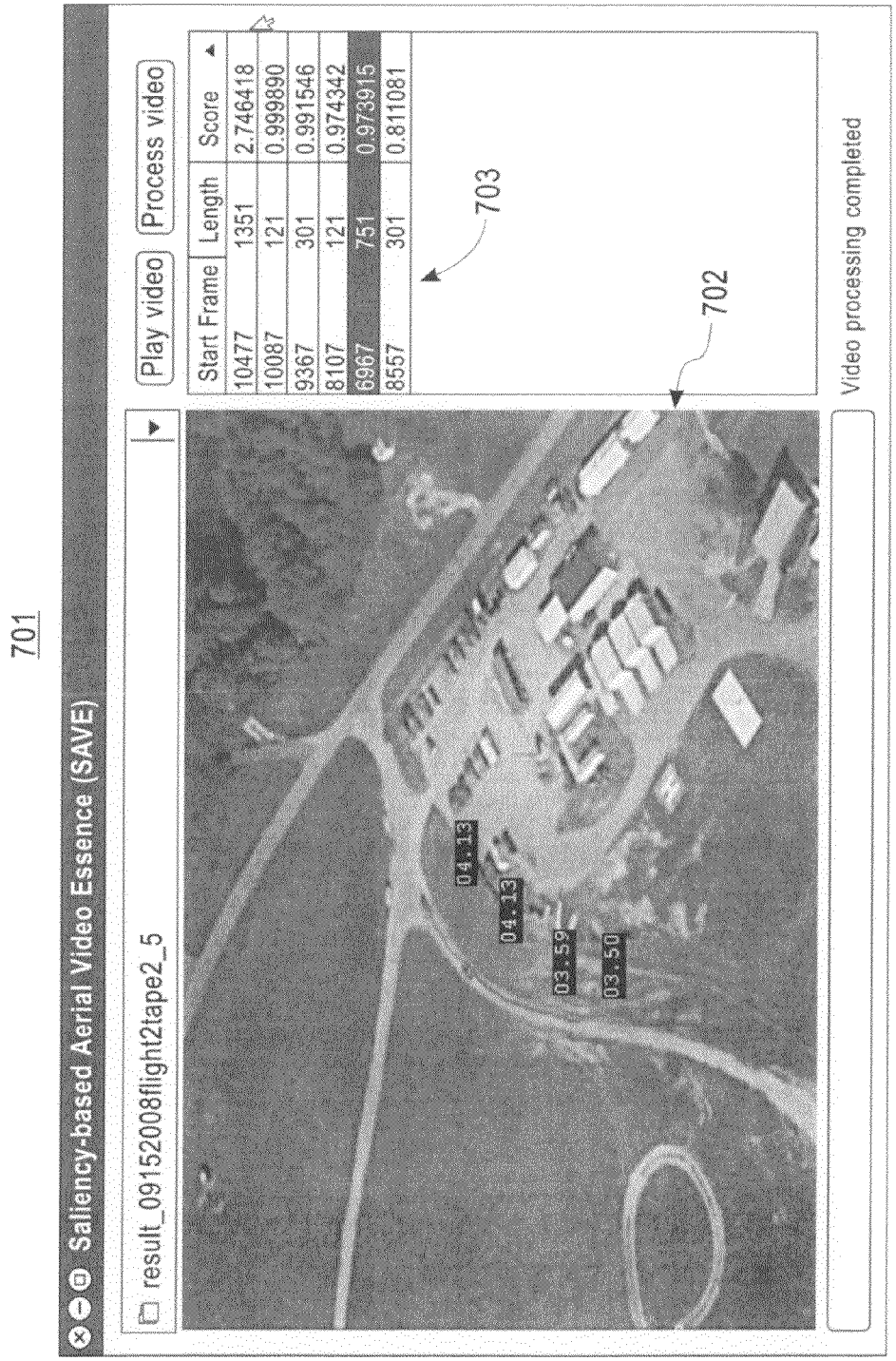
FIG. 7 illustrates an example of a user interface that can be used to present the summary visualization.

The video segments having scores above a particular threshold can be presented to an operator using a graphical user interface. The single-frame image representation of a video segment (see FIG. 3) may be referred to as a keyframe. FIG. 7 is an example of the graphical user interface 701 that can present one or more of the keyframes in a panel 702 and includes a menu 703 that enables the operator to select a different one of the available keyframes for presentation in the panel 702. In the example shown in FIG. 7, the menu 703 lists 6 key frames sorted according to their scores. Each item in the list indicates the start frame (or a start time) at which the event corresponding to the keyframe occurred and its length (or duration).

In an exemplary embodiment of the invention, the keyframe is created by superimposing all detected objects in the video segment into the first frame of the segment. This may be accomplished by transforming each track point in subsequent video frames back to the coordinate system of the first frame. In at least one embodiment of the invention, the transformations are performed by using the homographies H between each pair of frames, which have already been computed in the frame alignment step.

A transformation back 1 frame can be performed according to equation 3 as follows:

$$F_1 \to F_0: p_0 = H_{1\to 0} p_1 = H_{0\to 1}^{-1} p_1 \qquad (3),$$

and a transformation back t frames can be performed using a series of (3) according to equation 4 as follow:

$$F_t \to F_0: F_t \xrightarrow{Ht \to t-1} F_{t-1} \xrightarrow{Ht-1 \to t-2} \ldots \xrightarrow{H_1 \to 0} F_0. \qquad (4)$$

If a track point at frame t is back projected to frame will be outside the image boundary, in an exemplary embodiment of the invention, the track point is discarded.

Figure 8:
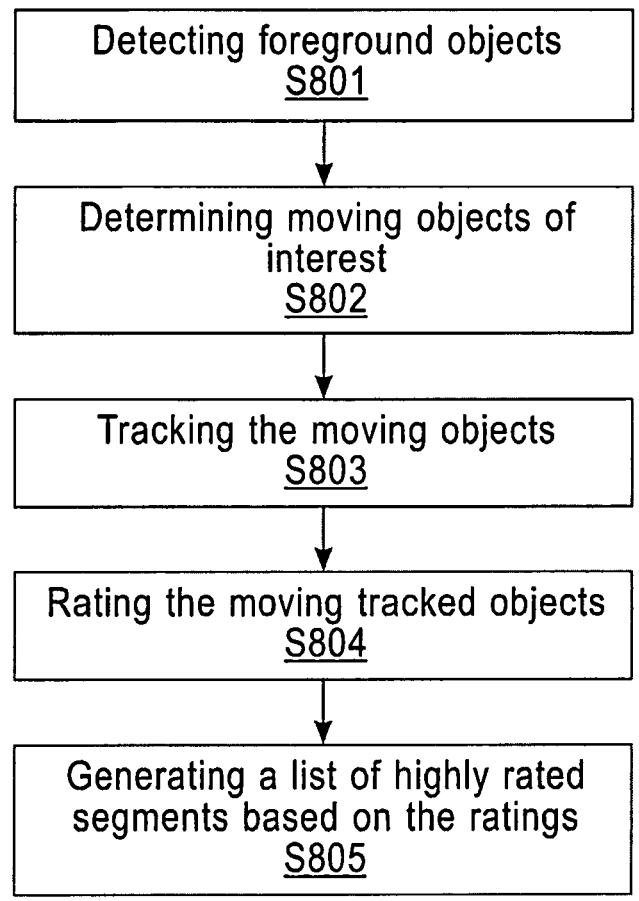
FIG. 8 illustrates a method of generating a summary visualization according to an exemplary embodiment of the invention.

FIG. 8 illustrates a high-level method according to an exemplary embodiment of the invention for summarizing image content from video images (e.g., UAV videos) received from one or more moving cameras. The method includes detecting foreground objects in the images (S801), determining moving objects of interest from the foreground objects (S802), tracking the moving objects (S803) (e.g., using meanshift and/or KLT tracking), rating movements of the tracked objects (S804) (e.g., smoother moving objects receive a higher rating, see above saliency metrics), and generating a list of highly rated segments within the images based on the ratings (S805). For example, the highly rated segments could be the segments that include several highly rated tracked objects.

A summary display (e.g., FIG. 3, FIG. 7, FIG. 9, etc.) can be created based on the list of highly rated segments, where each highly rated segment is representative of a potential event of interest. For example, the summary display may display one of the highly rated segments and the highly rated tracked objects it contains along with their trajectories within a single image (e.g., see above discussion of keyframe).

The summary display may overlay the keyframe with display of the geographic location of the start and end point of each of the displayed trajectories. The summary display may overlay the keyframe with display of the geographic boundaries or an approximate location of the keyframe. The summary display can overlay the keyframe with display of the start and end time of the video segment, with the identity of the camera(s) used to capture the images of the video segment, the identity of the vehicle that captured the images, the type of the vehicle, the type of the camera, etc.

Figure 9:
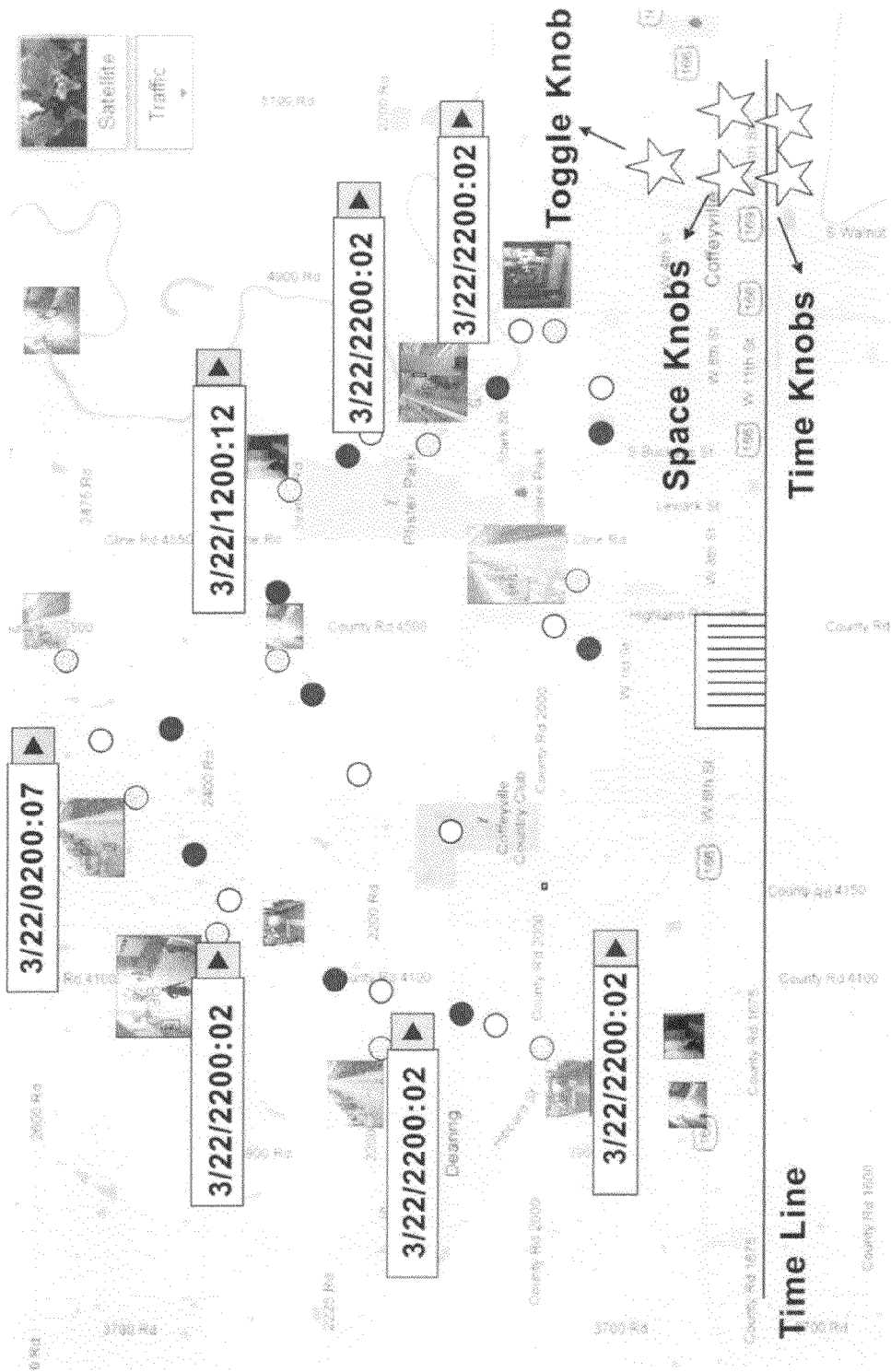
FIG. 9 illustrates another example of a user interface that can be used to present the summary visualization.

The detection of the foreground objects may have been performed by a classifier specially trained to find objects of a particular type (e.g., military vehicles, military personnel, civilians, etc). Thus, the summary display can overlay the keyframe with the detected type. Each keyframe may be referred to an event, and the summary display can be configured to convey the spatial organization of these events. For example, FIG. 9 is an illustration of a summary display where each keyframe is overlaid with a geographic map so the geographic location of each keyframe is clear. The summary display also illustrates the date/time of each event, where the time may include the start and end time.

The display may also include a number of knobs, such as space and time knobs. The time knob may be used to adjust the period of interest so that keyframes/events not present within the adjusted period may be filtered out and new keyframes/events present within the adjusted period may be filtered in. The space knobs can be used to adjust the map presented so that keyframes/events not present within the boundaries of the map may be filtered out and new keyframes/events present within the adjusted map may be filtered in. The display can be configured such that selection of a keyframe allows the user to zoom to see an expanded view of that keyframe. The display may also include a toggle knob that allows a user to toggle between viewing the events spatially as shown in FIG. 9 and viewing the events in another format such as the one shown in FIG. 7.

While embodiments of the invention have been described with respect to a single UAV including one or more cameras, in alternate embodiments, one or more additional UAVs may be present, and the image data from each may be fused together to generate the resulting keyframes for display. For example, one UAV could be used to track objects in one portion of a background and another UAV could be used to track objects in another portion of the background, and the highly rated tracked objects from both portions could be combined together into a single keyframe for presentation to an operator.

Figure 10:
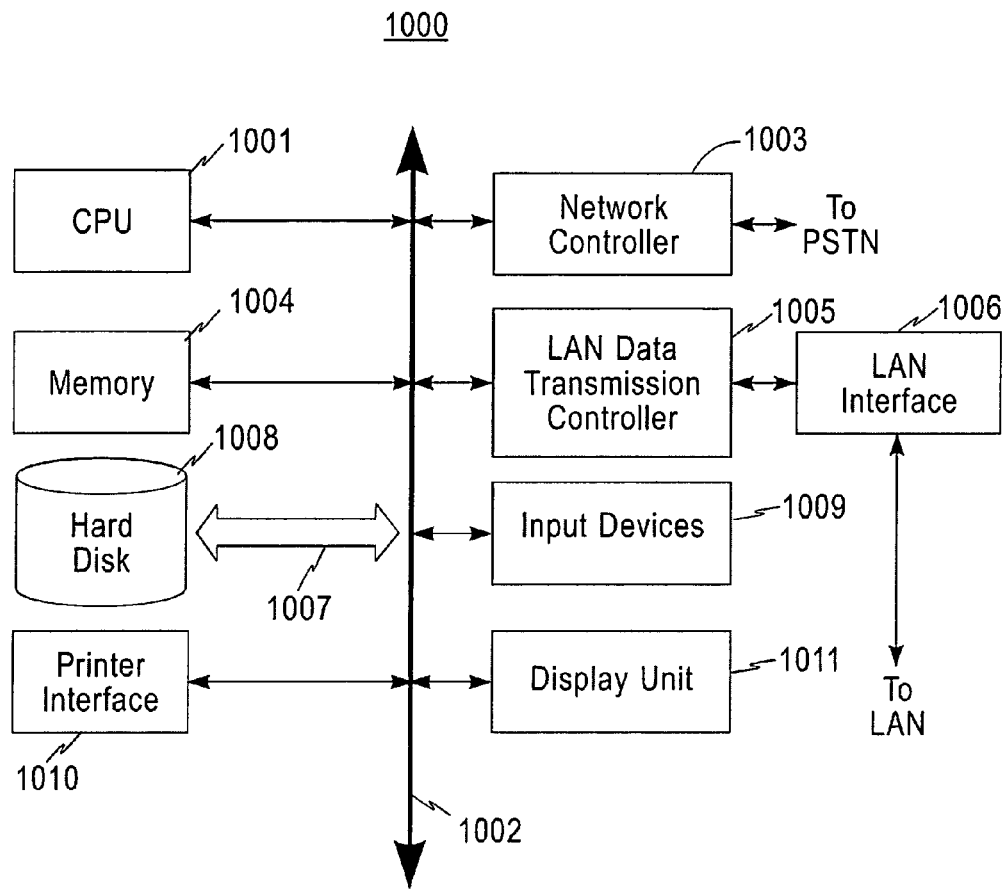
FIG. 10 illustrates an example of a computer system capable of implementing methods and systems according to embodiments of the disclosure.

FIG. 10 illustrates an example of a computer system, which may execute any of the above-described methods, according to exemplary embodiments of the invention. For example, the methods of FIGS. 2, 4, and 8, may be implemented in the form of a software application running on the computer system. Further, portions of the methods may be executed on one such computer system, while the other portions are executed on one or more other such computer systems. For example, the object detection and tracking steps S801-S803 of FIG. 8 could be located on one computer system while the rating and list generation steps S804-805 of FIG. 8 could be located on another computer system. For example, an onboard processor of the UAV 110 itself could perform the object detection and/or tracking. Examples of the computer system include a mainframe, personal computer (PC), a cable set-top box, a television microprocessor, a handheld computer, a server, etc. The software application may be stored on a computer readable media (such as hard disk drive memory 1008) locally accessible by the computer system and accessible via a hard wired or wireless connection to a satellite or a network, for example, a local area network, or the Internet, etc.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. For example, the display unit 1011 may be used to present the above described keyframes, summaries, etc. As shown, the system 1000 may be connected to a data storage device, for example, a hard disk 1008 (e.g., a digital video recorder), via a link 1007. CPU 1001 may be the computer processor that performs the above described methods.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" ox "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for summarizing image content from video images received from a moving camera, the method comprising:
 detecting foreground objects in the images;
 determining moving objects of interest from the foreground objects;
 tracking the moving objects;
 determining a smoothness value of a trajectory of each tracked object;
 rating movements of the tracked objects based on the determined smoothness values; and
 generating a list of highly rated segments within the video images based on the ratings.

2. The method of claim 1, wherein the rating comprises:
 assigning each tracked object a saliency metric corresponding to its smoothness value.

3. The method of claim 2, wherein the smoother the trajectory, the higher the saliency metric.

4. The method of claim 2, wherein the generating of the list comprises:
 discarding the tracked objects with a saliency metric below a threshold level; and
 generating groups of the remaining tracked objects that are contained within different respective time periods of the video images.

5. The method of claim 4, further comprises:
 generating a score for each group based on the saliency metrics of the tracked objects of the corresponding group; and
 discarding the groups whose score does not exceed a minimum threshold, wherein each remaining group corresponds to one of the highly rated segments.

6. The method of claim 5, wherein the score of a corresponding one of the groups is a sum of the saliency metrics of tracked objects of the groups.

7. The method of claim 4, further comprising:
 selecting one of the groups;
 generating a background image of the video images that contains all the tracked objects of the selected group; and
 overlaying the background image with the tracked objects of the selected group.

8. The method of claim 7, further comprising overlaying the background image with the trajectories of each of the tracked objects.

9. The method of claim 7, further comprising superimposing the overlaid image over a geographic map that bounds the tracked objects.

10. A method for summarizing image content from video images received from a moving camera, the method comprising:
 detecting foreground objects in the images;
 determining moving objects of interest from the foreground objects;
 tracking the moving objects;
 rating movements of the tracked objects; and
 generating a list of highly rated segments within the video images based on the ratings,
 wherein the detecting of the foreground objects comprises detecting the objects from an aligned image generated from performing image registration on consecutive frames of the video images.

11. The method of claim 10, wherein the performing of the image registration comprises:
 generating a forward frame difference between consecutive first and second frames of the video images;
 generating a backward frame difference between the second frame and a third consecutive frame of the video images; and
 generating the alignment image from the differences.

12. A method for summarizing image content from video images received from a moving camera, the method comprising:
 detecting foreground objects in the images;
 determining moving objects of interest from the foreground objects;
 tracking the moving objects;
 rating movements of the tracked objects; and
 generating a list of highly rated segments within the video images based on the ratings,
 wherein the tracking uses a combination of a Kanade-Lucas-Tomasi KLT based tracking approach and a MeanShift tracking approach.

13. The method of claim 1, wherein the detecting of the foreground objects comprises detecting the objects from an aligned image generated from performing image registration on consecutive frames of the video images.

14. The method of claim 1, wherein the tracking uses a combination of a Kanade-Lucas-Tomasi KLT based tracking approach and a MeanShift tracking approach.

15. The method of claim 1, wherein the detecting of the foreground objects comprises using blob detection to identify blobs and the tracking excludes the objects corresponding to the identified blobs.

16. The method of claim 10, wherein the performing of the image registration comprises calculating an affine homography between the consecutive frames.

* * * * *